Sept. 20, 1971  J. D. DAVIS  3,606,561
SWIVEL HEAD BORING BAR
Filed March 12, 1970  2 Sheets-Sheet 2
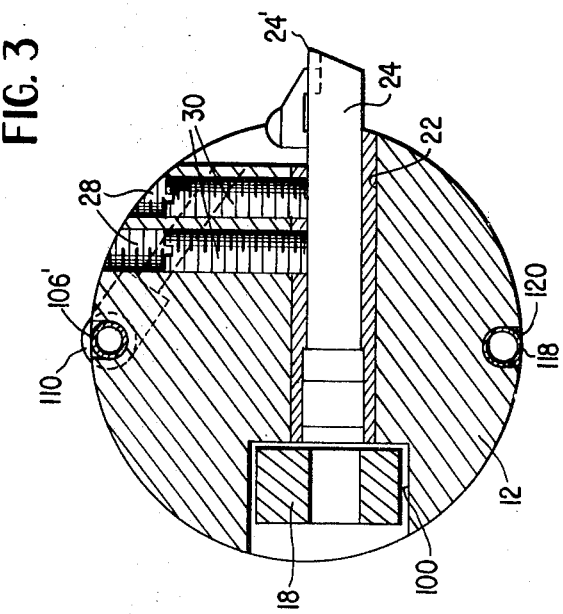
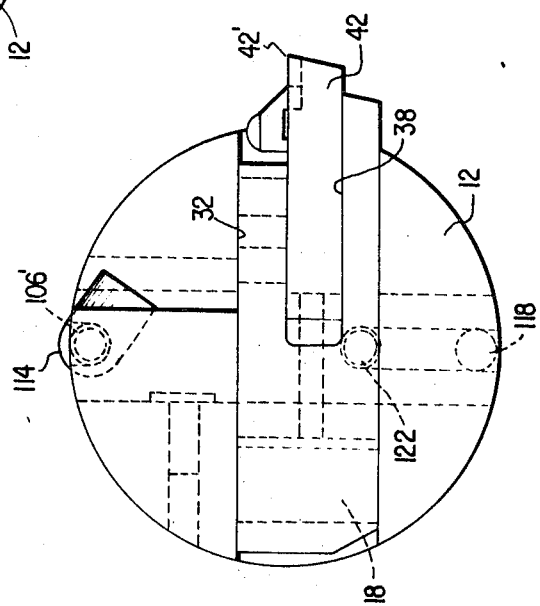
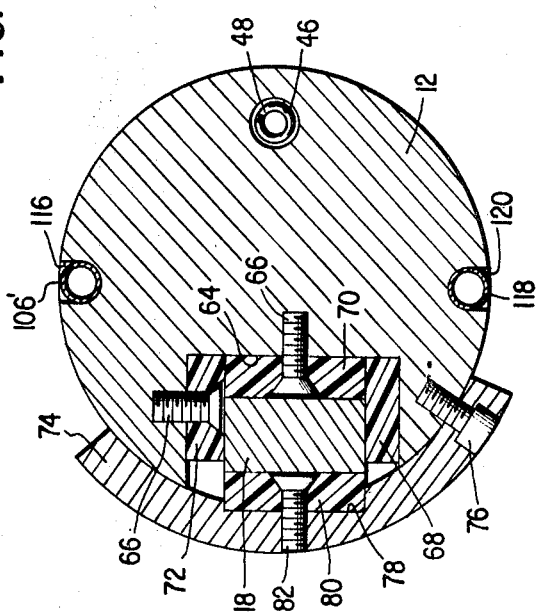
INVENTOR
JOHN D. DAVIS

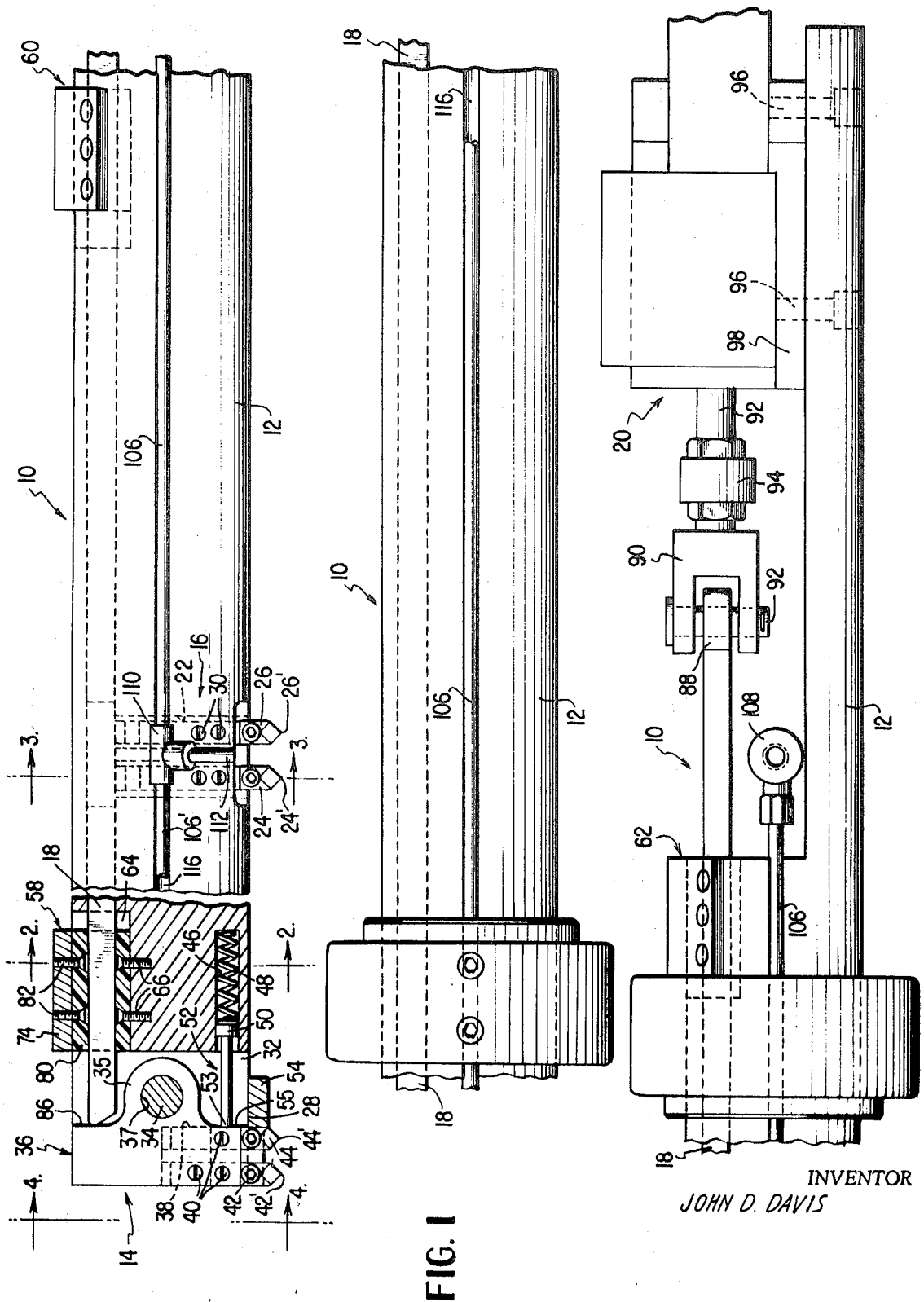

United States Patent Office 3,606,561
Patented Sept. 20, 1971

3,606,561
SWIVEL HEAD BORING BAR
John D. Davis, Ellettsville, Ind., assignor to Stewart-Warner Corporation, Chicago, Ill.
Filed Mar. 12, 1970, Ser. No. 18,968
Int. Cl. B23b *29/034*
U.S. Cl. 408—146                        7 Claims

ABSTRACT OF THE DISCLOSURE

An axially movable boring bar carries a plurality of radially directed tools at longitudinally spaced position with one of the tools being adjustably positioned about a pivot axis perpendicular to shaft axis to reduce the overall travel of the boring bar.

BACKGROUND OF THE INVENTION

Field of the invention

This invention relates to bi-directionally moving boring bars, suppirting cutting tools for internal boring of cast metal work pieces and the like, and more particularly to an improved boring bar having at least one swiveled tool head carried thereby.

Description of the prior art

Boring tools conventionaly involve means for supporting a boring bar or support shaft for bi-directional movement along the shaft axis. A cutting tool is fixed to the end of the shaft and projects radially from the shaft periphery for contact with the work pieces. Normally, the work piece constitutes a cylindrical metal casting having a formed internal hole which must be carefully increased in diameter by precisely cutting into the cylindrical work piece during rotation of the same. Conventionally, the radially projecting cutting tool is moved into contact with the internal wall of the casting at one side of the same, in such a manner as to bite into the internal wall surface and with the casting or other work piece rotating at high speed, the tool is fed in the direction of the boring bar axis at slow speed to effect removal of a portion of the internal wall of the casting. The depth of the cut or bite is, of course, determined by the capacity of the cutting tool, and the specific material forming the casting or other work piece.

SUMMARY OF THE INVENTION

This invention is directed to an improved boring bar having at least one swivel head which in turn carries one or more cutting tools with the cutting tool associated with the swivel head being carried outboard of one or more conventional, fixed cutting tools which project radially outwards from the periphery of the bi-directional moving boring bar. Preferably, the cutting tools associated with the swivel head are carried at the extreme outboard end of the boring bar for allowing adjustable positioning of the same about a pivot axis perpendicular to the boring bar axis. The swivel head may be spring biased away from a right angle, radial position toward a position in which the swivel head is angled and inside the boring bar periphery. A longitudinally shiftable actuator rod is supported within longitudinally spaced Teflon ways and has one end contacting the swivel head on the side opposite that of a coil spring biased plunger. The actuator rod is selectively shifted by a hydraulic motor or the like to force the swivel head to move into a right angle radial position with respect to the bar axis. This allows the boring bar to proceed part of the way into the work piece being bored, with the forward cutter at an angle and then by external application of a force from the hydraulic cylinder through the actuator rod, swivel the head into radial position and maintain the same so both tools can cut. The swivel head may carry both roughing and finishing tools in similar fashion to tools at fixed positions along the bar enabling all sets of tools to bore at the same time. Means are provided for delivering both coolant to the tools and air for clearing chips from behind the swivel head.

BRIEF DESCRIPTION OF THE DRAWINGS

FIG. 1 is a segmented, plan view, partially in section, of the improved swivel head boring bar of the present invention.

FIG. 2 is a front sectional view of the boring bar of FIG. 1 taken about lines 2—2.

FIG. 3 is a front sectional view of the boring bar of FIG. 1 taken about lines 3—3.

FIG. 4 is a front elevational view of the boring bar of FIG. 1.

DESCRIPTION OF THE PREFERRED EMBODIMENT

Referring to the drawings, the swivel head boring bar 10 comprises to a large extent an elongated shaft 12 which is mounted for reciprocating movement, that is, in a bi-directional manner in the direction of the shaft axis (by means not shown). The major components of the swivel head boring bar are identified as: the swivel head tool assembly 14 at the forward end of the bar 10, a fixed tool assembly 16 spaced rearwardly of the same a distance approximating half the length of the hole to be bored, an actuating rod 18 which extends the length of the shaft 12 and hydraulic motor 20 fixed to the shaft on the inboard end for selectively moving the swivel head into operative position. The metal shaft 12 is machined to facilitate the assembly of tool heads 14 and 16 onto the same. In this respect, at some point rearwardly of the outer end 28 of shaft 12 there is provided a transverse opening 22 which acts to support a pair of longitudinally spaced conventional cutting tools 24 and 26 respectively, the tool 24 for instance comprising a roughing tool, while tool 26 comprises a finishing tool. The tools are radially adjustable with respect to the axis of shaft 12 such that the cutting edges 24' and 26' project from the periphery of shaft 12 to a desired degree to facilitate internal cutting or boring of a work piece (not shown) by contacting the inner wall of the same. Shaft 12 in this respect is provided with tapped and threaded holes 28 which respectively receive adjustment screws 30 such that by tightening or loosening the adjustment screws 30, the cutting tools themselves may be radially adjusted within respective mounting slots of shafts 12 as desired. Once the position of the tool is properly located with respect to the axis of bar of shaft 12, the screws 30 are tightened and the tools locked in position.

At the extreme outer end 28 of the shaft 12, as evidenced by reference to FIGS. 1 and 4, the shaft is provided with an axially extending recess 32 which, as evidenced by FIG. 4, constitutes a narrow slot which is oriented horizontally and across which extends a fixed metal pivot pin 34. The pin 34 defines a vertical pivot axis for the tool swivel head assembly 14. The swivel head 36 constitutes in general a rectangular, machined, metal member having a rounded portion 35 extending to one side which carries a cylindrical bore 37 having a diameter on the order of pin 34. Head 36 is positioned on the pin so as to rotate about a vertical axis at right angles to the shaft axis as indicated in FIG. 4. The swivel head 36 carries an elongated slot 38 on one side for supporting a pair of tools 42 and 44. In this case tool 42 comprises a roughing tool and tool 44 a finishing tool, in similar fashion to tools 24 and 26 respectively. Again, adjustment screws or locking screws 40 are threadably received by the swivel head 36 and bear upon respective tools 42 and 44 for locking the tool at varying longitudinal positions within slot 38 so that, with the axis of tools 42 and 44 pivoted into a position at right angles to the shaft axis, the cutting edges 42' and 44' are parallel with cutting edges 24' and 26' of non-pivotable tools 24 and 26 respectively. An axially extending bore 46 is carried by shaft 12 rearwardly of recess 32, the bore 46 receiving a coil spring 48 and the headed end 50 of a plunger 52. The plunger 52 extends to assembly 14 with end 53 of the plunger 52 biased into abutting contact with face 55 of swivel head 36. As such, the compression spring 48 tends to pivot the swivel head 36 away from the right angle position shown with respect to the shaft axis and to some inclined position thereto, such that the cutting tools 42 and 44 move away from the inner wall of the work piece during insertion of the same within the work piece bore.

An important aspect of the present invention resides in the employment of an elongated actuating rod 18 for forceably pivoting the swivel head 36 to the right angle position shown in FIG. 1. The right angle position is defined by block 54 which is fixed to bar 12 by screws or the like. The block contacts face 55 of the swivel head to limit rotation about the pin axis. The actuator rod 18 extends almost the full length of the shaft 12 and is movable to and from the position shown in FIG. 1 by means of a hydraulic motor 20. In this respect, the actuator rod 18 is rectangular and is supported for reciprocation by a plurality of longitudinally identical spaced Teflon ways 58, 60, 62 constituting slide bearings. The shaft 12 carries a recess 64 which is rectangular in configuration, to the rear of axial recess 32 and within this recess there are positioned by means of screws 66 three rectangular Teflon blocks 68, 70 and 62. In addition, a sector cap 74 is provided at each Teflon way. The cap is coupled to the periphery of the shaft 12 by threaded screws 76 and the inner surface of the cap 74 is recessed at 78 to receive the fourth Teflon block 80. Block 80 is held to the sector 74 by means of screws 82. Thus, the elongated actuator rod 18 has its four sides riding on Teflon bearing surfaces defined by the individual blocks 68, 70, 62 and 80 to eliminate special tolerances normally required for such a relatively long actuating member. The leading end 84 of the actuator rod is beveled and/or rounded to effect application of the force at a prescribed surface area on one rear face 86 of the swivel head 36.

The inner end 88 of the actuator rod 18 is coupled to clevis 90 by a pin 92, clevis 90 in turn being coupled to output shaft 92 through coupling member 94 of the hydraulic motor 20. The fluid motor 20 constitutes a conventional hydraulic motor marketed under the trade name "Hydro-Pac" by the Indianapolis Building and Supply Corporation of Indianapolis, Ind. The Hydro-Pac 20 is fixed to the shaft 12 by a pair of screws 96 which extend into the hydraulic motor base 98. In fact, as evidenced by FIG. 3, a peripheral recess 100 extends the length of shaft 12 to allow free reciprocating movement of actuator rod 18 as supported by the three longitudinally spaced Teflon ways 58, 60 and 62.

The shaft 12 additionally carries means for delivering cooling fluid to the fixed tools and the swivel head tools during boring operation. In this respect, groove 116 supports metal tubing sections 106' and 106 whose inner end is coupled to a source of liquid (not shown) through a conventional elbow fitting 108. A T-fitting 110 couples tubing 106 to tubing extension 106' and at the same time fluid couples the tubing 106 to a short tubing section 112 which opens up just behind fixed cutting tools 24 and 26. The extension tubing 106' extends to the vicinity of the swivel head 36 where it terminates at elbow 114, elbow 114 being inclined so as to direct cooling liquid from the rear of the swivel cutting tools 42 and 44 toward the line of contact with the work piece. Preferably tubing 106 and extension 106' lies within a peripheral groove 116 along the top of shaft 12 while a tube 118 carrying compressed air lies within a diagonally opposite peripheral groove 120. The tube 118 carries compressed air and extends to the horizontal recess 32, opening up into the same at 122 to deliver sufficient compressed air to blow the chips out of the horizontal recess 32.

The swivel head boring bar 10 of the present invention reduces the boring time of conventional boring bars to half of that normally required and simultaneously minimized the taper produced in the bore.

In operation, the boring bar is inserted about one-half way into the part being bored up to the fixed cutter assembly 16 with the forward pair of cutters at an angle. This is accomplished by operating the fluid motor 20 such that the output shaft 92 moves from left to right causing the forward end 84 of the actuator bar rod 18 to follow the same which in turn causes the compression spring 48 to expand pivoting the swivel head assembly 14 clockwise from the right angle position shown in FIG. 1 to an inclined position with the cutting edges 42' and 44' of respecting cutting bars moving radially inwards. After insertion of the boring bar, a distance one-half way into the workpiece (not shown), the external application of force from the hydraulic motor 20 through the actuator rod 18, causes the forward head 36 to again swivel such that the tools 42 and 44 are at right angles and in cutting position in similar fashion to tools 24 and 26. Face 55 of swivel head 36 abuts limit block 54. Thus, for any given travel of the boring bar in either direction, two portions of the workpiece are being bored simultaneously. Further, by employing roughing and finishing tools at 24 and 42, and 26 and 44, respectively, both sets of tools bore at the same time. This combination of one-fourth the travel and twice the number of tools effectively reduces the boring time to one-fourth that required by normal, single-tipped boring bars. Turret including time and also sound and taper is reduced by the reduced amount of tool travel. Further, individual adjustment of the tools is provided and the multiple tool head boring bar readily provides lines for both the coolant and compressed air for cooling the tools during cutting and clearing the chips from behind the swivel head. Thus, in the absence of compressed air from tube 118, accumulation of chips within this area may prevent proper swiveling of head 36 during insertion and removal of the same within the workpiece being bored.

From the above it is evident that the improved boring bar of the present invention is not only precisely formed and constitutes a sophisticated tool, but it is one which is both simply and economically manufactured.

What is claimed is:

1. An improved boring bar comprising: a longitudinal shaft mounted for bi-directional movement along the shaft axis, means for fixably coupling a first cutting tool assembly to said shaft rearwardly of the forward end of said shaft with at least one cutting tool projecting radially from the shaft periphery for internal cutting of a hollow workpiece, and a second swivel head, cutting tool assembly carried by said shaft at the outboard end of same for pivoting about an axis at right angles to the axis of said shaft, and means for adjustably positioning said second tool assembly about said pivot axis.

2. The boring bar as claimed in claim 1 wherein: the outer end of said shaft includes a transverse slot, a pivot pin extends across said slot at right angles thereto, a swivel head is pivotably supported on said pivot pin and carries at least one cutting tool thereon, and means located to one side of said pivot axis for pivoting said swivel head to a position at right angles to the axis of said shaft and biasing means in contact with said swivel head on the opposite side of said pivot axis for resisting pivoting of said swivel head into right angle position.

3. The improved boring bar as claimed in claim 2 wherein: said biasing means comprises an axially extending recess within said shaft, inwardly of said transverse slot, a compression spring positioned within said recess and a plunger in contact with said compression spring at one end and said swivel head at the other end.

4. The improved boring bar as claimed in claim 2 wherein: said means for pivoting said swivel head in one direction comprises a slidable actuator rod extending parallel to and to one side of said shaft, and a plurality of longitudinally spaced bearing means supporting said slidable actuator rod.

5. The improved boring bar as claimed in claim 4 wherein: said longitudinally spaced bearing means comprise longitudinally extending recesses within the periphery of said shaft and a plurality of Teflon bars lining the surfaces of said recess and in contact with said slidable actuator rod.

6. The improved boring bar as claimed in claim 5 further comprising: a fluid motor coupled to the end of said actuator rod for causing reciprocating motion of the same.

7. An improved boring bar comprising: a shaft mounted for bi-directional movement along the shaft axis, means for fixably coupling a cutting tool assembly to said shaft, rearwardly of the forward end of said shaft and having at least one cutting tool projecting radially therefrom for internal cutting, a swivel head coupled to the outboard end of said shaft for pivoting about an axis at right angles to the shaft axis, at least one cutting tool carried by said swivel head for selective movement to a right angle position with respect to the shaft axis for cutting in conjunction with said first cutting tool, a plurality of longitudinally spaced Teflon bearings for slidably supporting an actuator rod for movement parallel to the shaft axis and into abutting contact with said swivel head to one side of said pivot pin, a spring biased plunger in contact with said swivel head on the opposite side of said actuator rod to resist pivoting of the same by movement of the actuator rod, a limit block fixed to said shaft for defining said right angle position, a fluid motor for effecting longitudinal shifting of said actuator rod, means for directing coolant fluid onto respective tools, and means for directing compressed air to said transverse slot carrying said swivel head so as to prevent accumulation of chips therein.

References Cited
UNITED STATES PATENTS

| | | | |
|---|---|---|---|
| 1,761,804 | 6/1930 | Snyder | 77—58M |
| 1,980,178 | 11/1934 | Berglund | 77—58M |
| 2,286,217 | 6/1942 | Martin | 77—58M |
| 2,383,050 | 8/1945 | Esson | 77—58C |
| 3,121,350 | 2/1964 | Warsewa et al. | 77—58C |

GERALD A. DOST, Primary Examiner